(12) United States Patent
Hwang et al.

(10) Patent No.: US 12,135,606 B2
(45) Date of Patent: Nov. 5, 2024

(54) ELECTRONIC APPARATUS THAT MONITORS A SAFETY FUNCTION AND A CONTROLLING METHOD THEREOF

(71) Applicant: SAMSUNG ELECTRONICS CO., LTD., Suwon-si (KR)

(72) Inventors: Sangyoung Hwang, Suwon-si (KR); Woomok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1006 days.

(21) Appl. No.: 17/111,691

(22) Filed: Dec. 4, 2020

(65) Prior Publication Data

US 2021/0182386 A1 Jun. 17, 2021

Related U.S. Application Data

(60) Provisional application No. 62/946,503, filed on Dec. 11, 2019.

(30) Foreign Application Priority Data

Mar. 23, 2020 (KR) .................. 10-2020-0035283

(51) Int. Cl.
  *G06F 11/07* (2006.01)
  *G06F 11/22* (2006.01)
  *G06N 3/04* (2023.01)
(52) U.S. Cl.
  CPC ...... *G06F 11/0796* (2013.01); *G06F 11/0736* (2013.01); *G06F 11/0751* (2013.01); *G06F 11/2263* (2013.01); *G06N 3/04* (2013.01)
(58) Field of Classification Search
  CPC ............. G06F 11/0796; G06F 11/0736; G06F 11/0751; G06F 11/2263; G06F 21/74;
  (Continued)

(56) References Cited

U.S. PATENT DOCUMENTS 8,649,906 B2   2/2014   Bischoff et al.
9,495,537 B2   11/2016  Gupta et al.
(Continued)

FOREIGN PATENT DOCUMENTS

JP   2018-022296 A   2/2018
JP     6380141 B2    8/2018
(Continued)

OTHER PUBLICATIONS

S. Kong, M. Lu, L. Li and L. Gao, "Runtime Monitoring of Software Execution Trace: Method and Tools, " in IEEE Access, vol. 8, pp. 114020-114036, 2020, doi: 10.1109/ACCESS.2020. 3003087.—shoot, bad date. (Year: 2020).*

(Continued)

*Primary Examiner* — Matthew M Kim
*Assistant Examiner* — Michael Xu
(74) *Attorney, Agent, or Firm* — Sughrue Mion, PLLC

(57) ABSTRACT

An electronic apparatus including a memory; and a processor including at least one core, among a plurality of cores, that is configured to execute an instruction corresponding to at least one safety function. The processor is further configured to, based on at least one instruction being executed in the at least one core while the electronic apparatus operates in a first state, identify whether the at least one instruction corresponds to the safety function based on an output of a trained neural network model; and based on a result of the identification, determine an operation state of the electronic apparatus as one of the first state or a second state.

20 Claims, 7 Drawing Sheets

(58) Field of Classification Search
CPC .......... G06N 3/04; G06N 3/044; G06N 3/045; G06N 3/08
See application file for complete search history.

(56) References Cited

U.S. PATENT DOCUMENTS

| | | |
|---|---|---|
| 10,350,749 B2 | 7/2019 | Wang |
| 10,656,643 B1* | 5/2020 | Bertram ................ B64D 45/00 |
| 10,754,760 B1* | 8/2020 | Levy .................. G06F 11/3636 |
| 2014/0325238 A1* | 10/2014 | Ghose ................ G06F 9/3834 711/125 |
| 2015/0234730 A1* | 8/2015 | Puthuff ............... G06F 11/3636 717/128 |
| 2016/0350194 A1* | 12/2016 | Mohan ............... G05B 23/0254 |
| 2017/0088164 A1* | 3/2017 | Kobayashi .......... G06F 11/0757 |
| 2018/0105183 A1 | 4/2018 | Kollmer |
| 2018/0143650 A1* | 5/2018 | Klaus .................... B60W 10/10 |
| 2018/0370540 A1* | 12/2018 | Yousuf ................. B60W 10/04 |
| 2019/0002239 A1* | 1/2019 | Zimmerli ............. B66B 5/0031 |
| 2019/0025813 A1* | 1/2019 | Cella ................... G06F 18/2178 |
| 2019/0049912 A1 | 2/2019 | Poornachandran et al. |
| 2019/0050515 A1* | 2/2019 | Su .......................... G06N 3/045 |
| 2019/0106117 A1* | 4/2019 | Goldberg ............. G05D 1/0088 |
| 2019/0155678 A1* | 5/2019 | Hsiong ............... G06F 11/0721 |
| 2019/0171536 A1 | 6/2019 | Refaeli et al. |
| 2019/0235943 A1* | 8/2019 | Gordani .............. G06F 11/0793 |
| 2019/0236223 A1* | 8/2019 | Banerjee ................ G06F 30/20 |
| 2019/0258251 A1 | 8/2019 | Ditty et al. |
| 2019/0276041 A1* | 9/2019 | Choi .................... G07C 5/0808 |
| 2019/0324422 A1* | 10/2019 | Capodanno ......... G06F 11/0739 |
| 2020/0125732 A1* | 4/2020 | Iyer ..................... G06F 11/3612 |
| 2020/0272735 A1* | 8/2020 | Leonhardi ............. G06F 11/079 |
| 2021/0001480 A1* | 1/2021 | Artes ....................... B25J 9/161 |
| 2021/0334366 A1* | 10/2021 | Flach ..................... G06F 21/64 |
| 2021/0334656 A1* | 10/2021 | Sjögren ................... G06N 3/04 |

FOREIGN PATENT DOCUMENTS

| | | |
|---|---|---|
| JP | 6392825 B2 | 9/2018 |
| KR | 10-1206241 B1 | 11/2012 |
| KR | 10-1245406 B1 | 3/2013 |
| KR | 102033387 B1 | 11/2019 |
| WO | 2018112495 A2 | 6/2018 |

OTHER PUBLICATIONS

Autosar "Autosar goes Multi-core—the Safe Way" Vector, Jun. 2014, (12 pages total).
KIPOST "Arm joined the market of autonomous driving . . . presented a 7 nano processor architecture" KIPOST, Sep. 27, 2018, retrieved from [https://www.kipost.net/news/articleView.html?idxno=4812] (7 pages total).
Communication issued Aug. 9, 2022 by the European Patent Office in European Patent Application No. 20898261.1.
Hoffmann et al: "Anomaly Detection in Multicore Embedded Systems," 2019 IX Brazilian Symposium on Computing Systems Engineering (SBESC), IEEE, Nov. 19, 2019 (Nov. 19, 2019), 8 total pages, XP033746343.
International Search Report (PCT/ISA/210) issued Apr. 7, 2021 by the International Searching Authority in International Application No. PCT/KR2020/018063.
Written Opinion (PCT/ISA/237) issued Apr. 7, 2021 by the International Searching Authority in International Application No. PCT/KR2020/018063.

* cited by examiner

ELECTRONIC APPARATUS THAT MONITORS A SAFETY FUNCTION AND A CONTROLLING METHOD THEREOF

CROSS-REFERENCE TO RELATED APPLICATIONS

This application is based on and claims priority under 35 U.S.C. § 119 to Korean Patent Application No. 10-2020-0035283, filed on Mar. 23, 2020, in the Korean Intellectual Property Office, and U.S. Provisional Application No. 62/946,503, filed on Dec. 11, 2019, in the U.S. Patent and Trademark Office, the disclosures of which are herein incorporated by reference in their entireties.

BACKGROUND

1. Field

The disclosure relates to an electronic apparatus and a controlling method thereof and more particularly, to an electronic apparatus that monitors an instruction executed in a core to identify whether there is any defect when a safety function is performed and a controlling method thereof.

2. Description of the Related Art

In order for a safety function of various devices to satisfy international safety standards, it is necessary to monitory whether the corresponding safety function satisfies Freedom from Interference (FFI) in comparison with general functions. In this case, satisfying FFI means the safety function can be independently performed without being affected by general functions from the perspective of hardware or software.

In order to satisfy FFI, the independence of a CPU or a memory which executes or stores a software program constituting the safety function must be guaranteed. However, when a new function is added due to a device package upgrade or the like, there is no guarantee that the added new function will not interfere with the CPU which performs the safety function. Therefore, conventionally, when an update occurs to add a new function, etc., it is necessary to check separately whether the safety function of the device is performed without defects. Additional cost and time may be required to check whether the safety function of the device is performed flawlessly.

SUMMARY

According to an aspect of the disclosure, an electronic apparatus includes a memory; and a processor comprising at least one core, among a plurality of cores, that is configured to execute an instruction corresponding to at least one safety function. The processor may be configured to: based on at least one instruction being executed in the at least one core while the electronic apparatus operates in a first state, identify whether the at least one instruction corresponds to the safety function based on an output of a trained neural network model; and based on a result of the identification, determine an operation state of the electronic apparatus as one of the first state or a second state.

The processor may be configured such that the at least one core is a core dedicated to execute only the instruction corresponding to the at least one safety function.

The neural network model may be a model trained based on information on a plurality of instructions corresponding to the at least one safety function. The information on the plurality of instructions may include an instruction code corresponding to each of the plurality of instructions, a factor corresponding to the instruction code, and information on a register corresponding to each of the plurality of instructions.

The processor may be further configured to: obtain a probability that the at least one instruction executed in the at least one core is an instruction corresponding to the at least one safety function based on the output of the neural network model; and based on the obtained probability being equal to or less than a threshold range, identify that the at least one instruction executed in the at least one core is an instruction corresponding to a function different from the at least one safety function.

The threshold range may be determined based on a safety integrity level of the at least one safety function.

The processor may be further configured to: based on identifying that the at least one instruction executed in the at least one core is an instruction corresponding to the at least one safety function, maintain the operation state of the electronic apparatus as the first state; and based on identifying that the at least one instruction executed in the at least one core is an instruction corresponding to a function different from the safety function, convert the operation state of the electronic apparatus to the second state.

The processor may be further configured to: based on an instruction, corresponding to a general function to be executed in remaining cores from among the plurality of cores, being updated, identify whether there is an instruction, stored in the memory, that corresponds to a function different from the at least one safety function and is from among instructions to be executed in the at least one core, wherein the remaining cores exclude the at least one core.

The processor may be further configured to, based on the operation state of the electronic apparatus being converted to the second state, control to stop a general operation performed by the electronic apparatus or block power of the electronic apparatus.

The processor may be further configured to, based on the operation state of the electronic apparatus being converted to the second state, provide a message indicating that an instruction corresponding to a function different from the at least one safety function is identified in the at least one core.

The processor may further include a communicator comprising a circuitry. The processor may be further configured to: control the communicator to transmit the at least one instruction executed in the at least one core to a server comprising the trained neural network model while the electronic apparatus operates in the first state; and receive, from the server, information regarding whether the at least one instruction is an instruction corresponding to a function different from the safety function.

According to another aspect of the disclosure, a controlling method of an electronic apparatus having a processor including at least one core, among a plurality of cores, that is configured to execute an instruction corresponding to at least one safety function, may include, identifying, based on at least one instruction being executed in the at least one core while the electronic apparatus operates in a first state, whether the at least one instruction corresponds to the safety function based on an output of a trained neural network model, and determining, based on a result of the identification, an operation state of the electronic apparatus as one of the first state or a second state.

The at least one core may be a core dedicated to execute only the instruction corresponding to the at least one safety function.

The neural network model may be a model trained based on information on a plurality of instructions corresponding to the at least one safety function. The information on the plurality of instructions comprises an instruction code corresponding to each of the plurality of instructions, a factor corresponding to the instruction code and information on a register corresponding to each of the plurality of instructions.

The identifying may include obtaining a probability that the at least one instruction executed in the at least one core is an instruction corresponding to the at least one safety function based on the output of the neural network model; and identifying, based on the obtained probability being equal to or less than a threshold range, that the at least one instruction executed in the at least one core is an instruction corresponding to a function different from the at least one safety function.

The threshold range may be determined based on a safety integrity level of the at least one safety function.

The determining may include maintaining, based on identifying that the at least one instruction executed in the at least one core is an instruction corresponding to the at least one safety function, the operation state of the electronic apparatus as the first state; and converting, based on identifying that the at least one instruction executed in the at least one core is an instruction corresponding to a function different from the safety function, the operation state of the electronic apparatus to the second state.

The identifying may include, based on an instruction, corresponding to a general function to be executed in remaining cores from among the plurality of cores, being updated, identifying whether there is an instruction, stored in a memory of the electronic apparatus, that corresponds to a function different from the at least one safety function and is from among instructions to be executed in the at least one core. The remaining cores may exclude the at least one core.

The converting may include controlling, based on the operation state of the electronic apparatus being converted to the second state, to stop a general operation performed by the electronic apparatus or block power of the electronic apparatus.

The converting may include providing, based on the operation state of the electronic apparatus being converted to the second state, a message indicating that an instruction corresponding to a function different from the at least one safety function is identified in the at least one core.

The method may further include transmitting the at least one instruction executed in the at least one core to a server including the trained neural network model while the electronic apparatus operates in the first state; and receiving, from the server, information regarding whether the at least one instruction is an instruction corresponding to a function different from the safety function.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
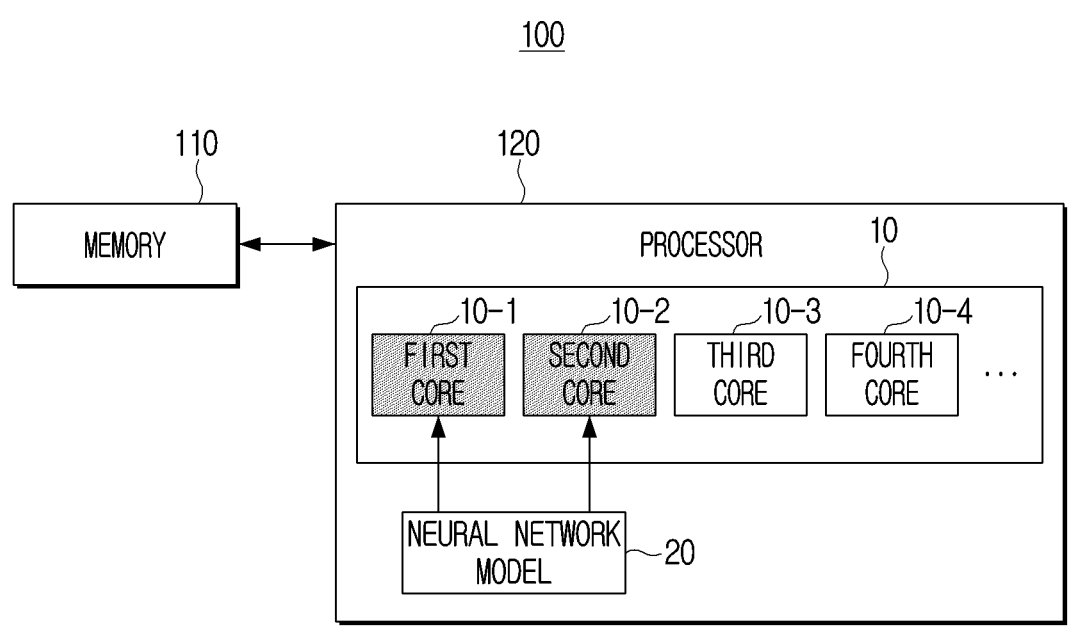
FIG. 1 is a diagram showing a configuration and an operation of an electronic apparatus according to an embodiment.

The present disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In the present disclosure, the terms "have", "may have", "comprise", "include", or "may comprise" designate the presence of the corresponding features (e.g., numbers, functions, operations or components such as parts, etc.), but do not exclude the presence of additional features.

In the description, expressions such as "A or B", "at least one of A and/or B", or "one or more of A and/or B" may include all possible combinations of the items listed together. For example, "A or B", "at least one of A and B", or "at least one of A or B" may refer to the cases of (1) including at least one A, (2) including at least one B, or (3) including at least one A and at least one B.

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, an expression "an apparatus configured to" may mean that the apparatus is "capable of" together with other apparatuses or components. For example, a "sub processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

The disclosure provides an electronic apparatus that monitors whether, in a core set to perform a safety function, an instruction corresponding to a function different from the safety function is executed, and a controlling method thereof.

An electronic apparatus 100 of FIG. 1 may selectively operate in one of a first state or a second state. In describing the present disclosure, the first state may be described as a normal state and the second state may be described as a safe state, but the first state and the second state are not limited thereto. The normal state may refer to a state where the electronic apparatus 100 is performing a general function and a safety function.

The safety function may include a function of the electronic apparatus 100 to monitor and control a risk factor that could occur while performing a general function. In other words, the safety function may include a function of monitoring whether a general function performed by the electronic apparatus 100 operates within a normal range, and if it is identified that the general function does not operate within the normal range, the safety function may limit the number, speed, location, etc. of the general function that is being performed. For example, if the general function is a speed control function of the electronic apparatus 100, the safety function may be a function of monitoring whether the speed of the electronic apparatus 100 exceeds a predetermined maximum speed, and based on identifying that the speed of the electronic apparatus 100 exceeds the predetermined maximum speed, reducing the speed. Accordingly, the electronic apparatus 100 may perform the safety function of monitoring and controlling the general function while operating in a safe state. An example embodiment thereof will be described in detail with reference to FIG. 4.

The safety function may include a safety function suggested by a standard set by the International Organization for Standardization according to the type of the electronic apparatus 100. For example, if the electronic apparatus 100 is implemented as a personal assistant robot, the safety function may include emergency stop, protective stop, safety speed control, dangerous collision avoidance, work space limitation, safety output control, and stability control function according to a standard suggested by ISO 13482. However, this is only an example, and if a general function is added according to an update of the electronic apparatus, the safety function may also be added as a function of monitoring and controlling the added general function, and it can be newly added by a user.

The safe state may refer to a state in which the electronic apparatus 100 performs a predefined operation without performing a general function and a safety function. For example, when operating in the safe state, the electronic apparatus 100 may stop the general function and the safety function that is currently performed, cut off power of the electronic apparatus 100 or provide a user with a message that the safety function may not operate normally. Conditions for the electronic apparatus 100 to convert an operation state from the normal state to the safe state, and embodiment related to the operation that the electronic apparatus 100 performs in the safe state, will be described in detail later.

A processor 120 of the electronic apparatus 100 in FIG. 1 may include a plurality of cores, and at least one of the plurality of cores may be a dedicated core set to execute only an instruction corresponding to the safety function. The electronic apparatus 100 may monitor whether an instruction of a function different from the safety function is executed in the dedicated core. If it is identified that an instruction of a function different from the safety function is executed in the dedicated core, the electronic apparatus 100 may convert the operation state of the electronic apparatus from a normal state to a safe state.

The electronic apparatus 100 according to an embodiment may be implemented as a mobile robot, and may also be implemented as a control system capable of controlling the overall operations of the mobile robot. However, this is only an example, and the electronic apparatus 100 may be implemented as a device which is mounted on a transport device to control the operation of the transport device. For example, if the electronic apparatus 100 is part of a transport device that controls the transport device, the electronic apparatus 100 may be an Advanced Driver Assist System or may be a part of the system. Alternatively, the electronic apparatus may be, for example, an electronic control device such as an Electronic Control Unit (ECU) that controls various functions, etc. related to the operation of a transport device, or may be part of the device.

In another embodiment, if the electronic apparatus 100 may be an external device that is mounted on a transport device, the electronic apparatus 100 may be, for example, a driver assist device such as a self-diagnosis device (on board diagnostics, OBD), a navigation, etc. connected to a vehicle connector (e.g., an OBD terminal or an OBD connector), or may be part of the same. According to another embodiment, the transport device may be a device that can be moved by a person or loaded with cargo, and may include, for example, a vehicle, an airplane, a motorcycle, a ship or a train.

In another embodiment, the electronic apparatus 100 may include a portable terminal device such as a smart phone, a tablet personal computer (PC), a mobile phone, a video phone, an e-book reader, a desktop PC, a laptop PC, a netbook computer, a personal digital assistant (PDA), a mobile medical device, a camera, an internet of things, or a wearable device, or may be part of the same.

Hereinafter, the above-described operation will be described in greater detail with reference to each component of FIG. 1. FIG. 1 is a diagram of the operation and configuration of the electronic apparatus 100 according to an embodiment. As shown in FIG. 1, the electronic apparatus 100 may include a memory 110 and a processor 120. However, the configuration shown in FIG. 1 is an exemplary view for implementing embodiments, and appropriate hardware and software components that are obvious to those skilled in the art may be further included in the electronic apparatus 100.

The memory 110 may store commands or data related to at least one different component of the electronic apparatus 100. In addition, the memory may be accessed by the processor 120, and may perform readout/recording/deleting/updating of data by the processor 120.

In particular, the memory 110 may store a plurality of instruction sets to be executed in a plurality of cores included in the processor 120 and a trained neural network model 20. The plurality of instruction sets and the trained neural network model 20 stored in a non-volatile memory may be loaded to a volatile memory under the control of the processor 120. In addition, the cores included in the processor 120 may execute the plurality of instructions loaded onto the volatile memory. The trained neural network model 2110 loaded onto the volatile memory 120 may monitor instructions executed in a dedicated core. Loading may refer to an operation of calling and storing data stored in the non-volatile memory in the volatile memory so that it can be accessed by the processor 120.

An instruction may mean one action statement that the processor 120 can directly execute in a programming language, and may be a minimum unit for execution or operation of a program. The instruction may include an instruction code (or an opcode) and an operand (or an argument). The instruction code may represent the type of operation corresponding to an instruction, and the operand may be a subject of computation of the instruction code and may include information on data, the memory 110 where the data is stored, or the address of a register.

The plurality of instruction sets stored in the memory 110 may include instructions corresponding to a plurality of safety functions and instructions corresponding to general functions different from the safety functions.

The trained neural network model 20 may be a model that under the control of the processor 120, is trained to monitor and identify whether an instruction executed in a dedicated core set to execute only an instruction corresponding to a safety function from among a plurality of cores included in the processor 120 is an instruction corresponding to the safety function. For example, referring to FIG. 1, if a first core 10-1 and a second core 10-2 are dedicated cores set to execute only an instruction corresponding to a safety function, the trained neural network model 20 may monitor the instruction that is executed in the dedicated cores 10-1, 10-2. Specifically, if the instruction that is executed in the first core 10-1 and the second core 10-2 is input, the trained neural network model 20 may identify whether the input instruction is an instruction corresponding to a safety function that is set to be executed in each core. An embodiment of the process of the trained neural network model monitoring whether the instruction executed in the dedicated cores 10-1, 10-2 is an instruction corresponding to a function different from the safety function will be described in detail with reference to FIG. 3.

According to the embodiment of FIG. 1, there is one trained neural network model 20, but this is only an example. The number of trained neural network models 20 may be determined according to the number of dedicated cores. For example, if there are two dedicated cores, two trained neural network models may be provided so as to monitor instructions executed in each dedicated core. In other words, as shown in FIG. 1, one neural network model 20 may monitor instructions executed in the plurality of dedicated cores 10-1, 10-2 simultaneously, but each of a plurality of trained neural network models may take charge of each of a plurality of dedicated cores to monitor instructions executed in each dedicated core.

The trained neural network model 20 may be stored in a non-volatile memory and then loaded onto a volatile memory under the control of the processor 120. In an embodiment, when the electronic apparatus 100 is turned on, the neural network model 20 may be loaded onto a volatile memory until the electronic apparatus 100 is turned off under the control of the processor 120. In other words, when the electronic apparatus 100 is turned on, the trained neural network model may always be loaded onto a volatile memory.

In another embodiment, when the electronic apparatus 100 performs a predefined operation, the processor 120 may load the neural network model 20 onto a volatile memory. In other words, only when the electronic apparatus performs a predefined operation, the processor 120 may load a neural network model onto a volatile memory, thereby reducing the usage of the processor 120. The operation for loading the neural network model 20 onto a volatile memory may be defined by a user command of the electronic apparatus 100. In other words, when performing a specific operation, the processor 120 may receive a user command to load the neural network model onto a volatile memory through an input unit that is implemented as a keyboard, a touch sensor, a microphone, etc. Accordingly, when the electronic apparatus 100 performs the operation defined by the user command, the processor 120 may load the neural network model 20 onto a volatile memory.

For example, when the electronic apparatus 100 stops and moves, the processor 120 may receive a command to load the neural network model 20 onto a volatile memory through a keyboard or a touch sensor. Subsequently, when the electronic apparatus 100 stops and moves, the processor 120 may load the trained neural network model 20 stored on a non-volatile memory onto a volatile memory. The operation predefined by a user command that the processor 120 receives through an input unit that can be implemented as various devices can be added/deleted/modified.

The non-volatile memory may refer to a memory capable of retaining stored information even when power supply is cut off (e.g., a flash memory, a Programmable Read-Only Memory (PROM), a Magnetoresistive Random-Access Memory (MRAM) and Resistive RAM (RRAM)). The volatile memory 110 may refer to a memory which requires continuous power supply in order to retain stored information (e.g., a Dynamic Random-Access Memory (DRAM) and a Static RAM (SRAM)).

FIG. 1 shows an embodiment in which a volatile memory is included in the processor 120 as a component of the processor 120, but the volatile memory may be implemented as a component separate from the processor 120. In other words, in describing the present disclosure, it will be assumed that the volatile memory is a component of the processor 120 and thus it is included in the processor 120, but this is only to clearly explain the operation of the electronic apparatus 100 according to an embodiment. The volatile memory according to an embodiment can be implemented as a component separate from the processor 120.

The processor 120 may be electrically connected to the memory 120 and control the overall operations of the electronic apparatus 100. In describing the present disclosure, the processor 120 may consist of one processor or a plurality of processors, or may be implemented as a general-purpose processor such as a Central Processing Unit (CPU). However, this is only an example, and the processor 120 may be implemented as a graphic-only processor such as a Graphics-Processing Unit (GPU), a Visual Processing Unit (VPU), etc., or an artificial intelligence (AI)-only processor such as a Neural Processing Unit (NPU).

In particular, the processor 120 may include a plurality of cores 10-1, 10-2, 10-3, and 10-4. Specifically, the plurality of cores may be included in a die 10 in the processor 120. The cores may be components including a core processing circuit that performs various operations such as execution of instructions in the processor 120. FIG. 1 shows that a plurality of cores are included in one die 10, but this is only an example. There may be a plurality of dies. When there are a plurality of dies, a predetermined number of cores may be included in each die.

As shown in in FIG. 1, the first core 10-1 and the second core 10-2, from among the plurality of cores included in the processor 120, may be set to perform only at least one safety function. In other words, the first core 10-1 and the second core 10-2 which are dedicated cores set to perform only a safety function, from among cores included in the processor 120, may execute only an instruction corresponding to the safety function from among a set of instructions included in the memory 110. However, not only two cores from among a plurality of a plurality of cores may be set to execute an instruction corresponding to a safety function, but also one or more than three cores may be set to perform only a safety function. The process of executing an instruction by a core included in the processor 120 may include fetching at least one instruction from a set of instructions included in the memory 110 by the core and decoding the fetched instruction.

While the electronic apparatus 100 operates in a normal state, if at least one instruction is executed in the first core 10-1 and the second core 10-2, the processor 120 may identify whether the at least one instruction executed in the first core 10-1 and the second core 10-2 is an instruction corresponding to a safety function through the trained neural network model 20. Specifically, if the electronic apparatus 100 operates in the normal state, the first core 10-1 and the second core 10-2 may execute an instruction corresponding to the safety function loaded from the memory 120, and the remaining cores 10-3, 10-4 excluding the dedicated cores may execute an instruction corresponding to the general function loaded from the memory 120. In this case, as shown in FIG. 1, the trained neural network model 20 may monitor and identify whether an instruction executed in the first core 10-1 and the second core 10-2 is an instruction corresponding to a function different from the safety function.

The processor 120 may train the neural network model 20 based on information on a plurality of instructions (or a content regarding a plurality of instructions) corresponding to at least one safety function to be executed in the first core 10-1 and the second core 10-2. For example, the information on a plurality of instructions may include information on an opcode of each of the plurality of instructions, an operand of the opcode, a register corresponding to each of the plurality of instructions, and the like. The information on a register corresponding to each of the plurality of instructions may include a register (a program counter) including an address where an instruction that can be executed after a specific instruction is executed is stored, a register value or stack information where a specific instruction is stored, and the like. The stack means a temporary memory device that allocates and uses part of the memory 110 or a register so that data can be stacked temporarily and accessed and used by the processor 120 when necessary. So far, an embodiment in which the neural network model 20 is trained by the processor 120 has been described, but this is only an example. In other words, the neural network model 20 may be a model which is pre-trained through an external device or an external system, and it can be trained based on learning data that the processor 120 received through a communication unit from an external server.

The trained neural network model 20 may monitor and identify whether an instruction corresponding to a safety function is executed in the dedicated cores 10-1, 10-2 set to perform the safety function under the control of the processor 120. Specifically, the processor 120 may input an instruction executed in the first core 10-1 and the second core 10-2 to the trained neural network model 20 in real time. Subsequently, the trained neural network model 20 may output information regarding whether the input instruction is an instruction corresponding to the safety function to be executed through the dedicated cores 10-1, 10-2. For example, the neural network model 20 may output a probability value that at least one instruction executed in the dedicated cores 10-1, 10-2 is an instruction corresponding to a safety function to be performed in the dedicated cores 10-1, 10-2.

In an embodiment, if the obtained probability value is equal to or less than a threshold range, the processor 120 may identify that the instruction executed in the dedicated cores 10-1, 10-2 is an instruction corresponding to a function different from a safety function. In another embodiment, if the obtained probability value exceeds the threshold range, the processor 120 may identify that the instruction executed in the dedicated cores 10-1, 10-2 is an instruction corresponding to a safety function which is trained previously.

The processor 120 may determine a threshold range according to a safety integrity level which is used in ANSI/ISA-S84.01 and IEC 61508. For example, it may be determined that the higher the safety integrity level of a safety function corresponding to an instruction to be executed by the dedicated cores 10-1, 10-2, the higher the threshold range of the processor 120. For example, if the level of the safety function with the highest safety integrity level from among safety functions corresponding to an instruction to be executed in the dedicated cores 10-1, 10-2 is SIL 3, the processor 120 may determine that the threshold range is a value higher than when the level of the safety function with the highest safety integrity level from among the safety functions is SIL 2. Accordingly, by increasing the threshold range as the safety integrity level of the safety function to be performed gets higher as the dedicated cores 10-1, 10-2 execute the instruction, the probability that the processor 120 misjudges an instruction corresponding to a general function as an instruction corresponding to a safety function may be reduced. However, this is only an example, and the threshold range may be a predetermined value according to the type of the electronic apparatus 100. In addition, the threshold range may be changed by a user command.

The processor 120 may determine the operation state of the electronic apparatus 100 as one of a safe state or a normal state. Specifically, if it is determined that at least one instruction executed by the dedicated cores 10-1 and 10-2 is an instruction corresponding to a function different from a safety function, the processor 120 may convert the operation state of the electronic apparatus 100 from a normal state to a safe state. When the state of the electronic apparatus 100 is converted to the safe state, the processor 120 may provide a message indicating that an instruction corresponding to a general function different from the safety function is identified in at least one dedicated core. For example, the processor 120 may control a communication unit to transmit a message indicating that an instruction corresponding to a general function is identified in a dedicated core to a user terminal device which is preregistered in the memory 110. In another embodiment, the processor 120 may control a display to display a message indicating that an instruction corresponding to a general function is identified in a dedicated core or may output the message in the form of voice.

In another embodiment, when the operation state of the electronic apparatus 100 is converted to the safe state, the processor 120 may stop a general operation that is performed by the electronic apparatus 100 or cut off power of the electronic apparatus 100. For example, if the electronic apparatus 100 performs a general function as the dedicated cores 10-1, 10-2 execute an instruction corresponding to a general function different from a safety function, the processor 120 may stop the general operation that is currently performed by the electronic apparatus 100 or cut off the power of the electronic apparatus 100.

When the state of the electronic apparatus 100 is converted to the safe state, the operation that the processor 120 controls to be performed may be determined by a safety integrity level. For example, if the safety integrity level of the safety function to be executed in the dedicated cores 10-1, 10-2 is equal to or less than a predetermined level and the operation state is converted to the safe state, the processor 120 may provide only a message indicating that an instruction corresponding to a general function is identified and not perform the operation of stopping the operation of the general function or the operation of cutting off the power of the electronic apparatus 100. Alternatively, if the safety integrity level of the safety function to be executed in the dedicated cores 10-1, 10-2 exceeds the predetermined level and the operation state is converted to the safe state, the processor 120 may provide a message indicating that an instruction corresponding to a general function is identified and at the same time, may control to stop the general function performed by the electronic apparatus 100 or cut off the power of the electronic apparatus 100. However, this is only an example, and the operation of conversion to the safe state may be implemented in various ways, and it may be changed/added/modified by a user command.

When various functions of the electronic apparatus 100 are updated through package update, etc., the processor 120 may identify whether an instruction to be executed in the dedicated cores 10-1, 10-2 stored in the memory 110 is an instruction corresponding to a function different from a safety function through the trained neural network model 20. When various functions of the electronic apparatus 100 are updated through package update, etc., a plurality of instructions stored in the memory 110 may be added/modified/deleted. In this case, an instruction corresponding to a function different from the safety function may be included in a part of the instructions set to be executed in the dedicated cores 10-1, 10-2. Accordingly, when various functions of the electronic apparatus are updated, the processor 120 may identify whether an instruction to be executed in the dedicated cores 10-1, 10-2 from among instructions stored in the memory 110 is an instruction corresponding to the safety function through the trained neural network model 20. The process of identifying whether an instruction to be executed in the dedicated cores 10-1, 10-2 is an instruction corresponding to a function different from the safety function through the trained neural network model 20 has been described above and thus, further description will not be provided.

If it is identified that a part of the instructions to be executed in the dedicated cores 10-1, 10-2 stored in the memory 110 is an instruction corresponding to a function different from the safety function, the processor 120 may convert the operation state from a normal state to a safe state.

The functions related to artificial intelligence according to some embodiment are performed through a processor and a memory. The processor may consist of one or a plurality of processors. In this case, one or a plurality of processors may be a general-purpose processor such as CPU, AP, Digital Signal Processor (DSP), and the like, a graphic-only processor such as GPU, Vision Processing Unit (VPU) and the like, or an AI-only processor such as NPU. One or a plurality of processors may process input data according to a predefined operation rule stored in a memory or an artificial intelligence model. Alternatively, if one or a plurality of processors are AI-only processors, the AI-only processors may be designed in a hardware structure specialized for processing a specific artificial intelligence model.

Figure 2:
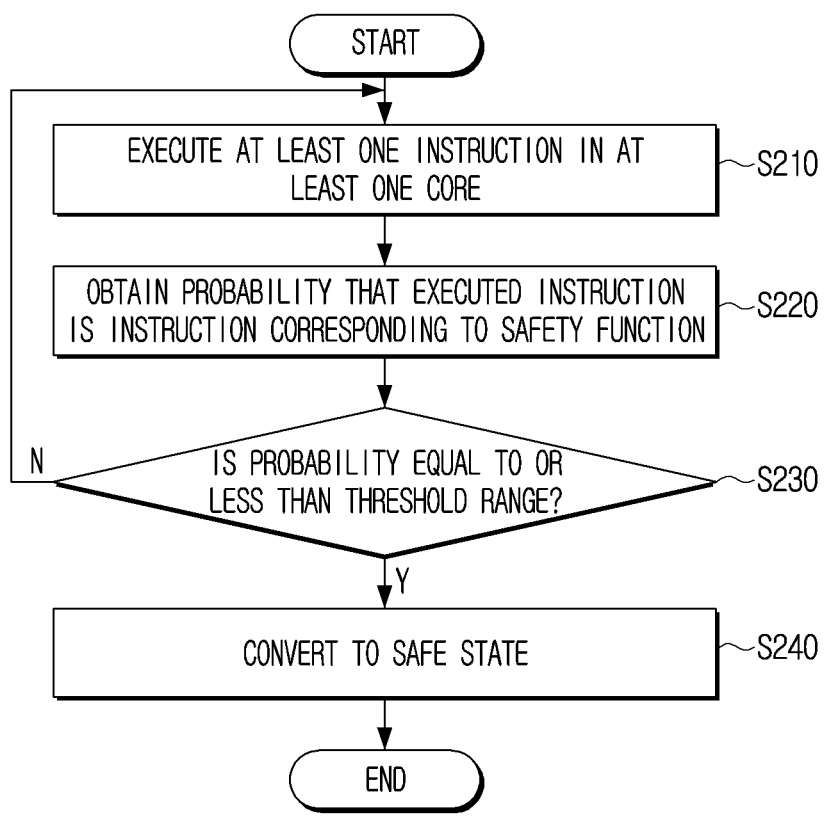
FIG. 2 is a flowchart of an operation of an electronic apparatus according to an embodiment.

The predefined operation rule or the artificial intelligence model may be characterized by being created through learning. Here, being created through learning means creating a predefined operation rule or an artificial intelligence model that is set to perform a desired characteristic (or purpose) as a basic artificial intelligence model is trained by a learning algorithm using a plurality of learning data. Such learning may be conducted in an apparatus itself where artificial intelligence according to an embodiment is performed, or may be conducted through a separate server and/or system. The examples of the learning algorithm include supervised learning, unsupervised learning, semi-supervised learning or reinforcement learning, but are not limited thereto The artificial intelligence model may be composed of a plurality of neural network layers. Each of the plurality of neural network layers may have a plurality of weight values, and may perform a neural network operation through operation between a result of an operation of the previous layer and the plurality of weight values. The plurality of weight values of the plurality of neural network layers may be optimized by a learning result of the artificial intelligence model. For example, the plurality of weight values may be updated so that a loss value or a cost value obtained from the artificial intelligence model during the learning process is reduced or minimized. The artificial neural network may include a Deep Neural Network (DNN) and for example, may be a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), a Deep Q-Networks, etc. However, the artificial neural network is not limited to the above-mentioned examples, FIG. 2 is a flowchart of an operation of the electronic apparatus 100 according to an embodiment. First, at least one instruction may be executed in at least one core included in the processor 120 while the electronic apparatus 100 operates in a normal state (S210). In this case, the at least one core may be a dedicated core set to execute only an instruction corresponding to a safety function. When the electronic apparatus 100 operates in the normal state, an instruction corresponding to a general function may be executed in the remaining cores excluding the at least one dedicated core from among a plurality of cores while an instruction corresponding to the safety function is executed in the at least one dedicated core.

The electronic apparatus 100 may obtain a probability that an instruction executed in the dedicated cores is an instruction corresponding to a safety function (S220). Specifically, the electronic apparatus 100 may input an instruction executed in the dedicated cores to a trained neural network model. The trained neural network model may identify whether an input instruction is an instruction corresponding to a safety function that is set to executed in the dedicated cores through the probability value.

The electronic apparatus 100 may train a neural network model based on information on a plurality of instructions corresponding to at least one safety function to be executed in the dedicated cores. In this case, the information on a plurality of instructions (or context information on a plurality of instructions) may include an opcode of each of the plurality of instructions, an operand of the opcode, a register corresponding to each of the plurality of instructions, and the like. The neural network model trained by the electronic apparatus 100 may output a probability that an instruction corresponding to a safety function exists from among instructions executed in the dedicated cores. For example, the more different the pattern of the instruction executed currently in the dedicated cores from the pattern of the instruction corresponding to a safety function, the lower probability value may be output by the neural network model.

The electronic apparatus 100 may identify whether the probability value output by the trained neural network model is equal to or less than a threshold range (S230). In this case, the electronic apparatus 100 may determine the threshold range according to a safety integrity level used in ANSI/ISA-S84.01 and IEC 61508. For example, by increasing the threshold range as the safety integrity level of the safety function to be performed as the dedicated cores 10-1, 10-2 execute an instruction gets higher, the probability that the electronic apparatus 100 misjudges an instruction corresponding to a general function as an instruction corresponding to a safety function may be reduced.

In an embodiment, when the probability value exceeds the threshold range, it may mean that there is a high probability that an instruction executed in the dedicated cores is an instruction corresponding to a safety function. Accordingly, if the probability value output by the neural network model exceeds the threshold range, the electronic apparatus 100 may operate in a normal state and perform a general function and a safety function.

In another embodiment, when the probability value is equal to or less than the threshold range, it may mean that there is a high probability that an instruction executed in the dedicated cores is an instruction corresponding to a function different from a safety function. Accordingly, if the probability value output by the neural network model is equal to or less than the threshold range, the electronic apparatus 100 may convert the operation state from a normal state to a safe state (S240). When the operation state is converted to the safe state, the electronic apparatus 100 may control to stop the general operation or the safety operation that is currently performed, or cut off the power of the electronic apparatus 100. In another embodiment, the electronic apparatus 100 may provide a message indicating that an instruction corresponding to a function different from the safety function is executed in the dedicated cores. In this case, the electronic apparatus 100 may output the message in the form of voice or display the message. In addition, the electronic apparatus 100 may output an alert sound corresponding to the message.

Figure 3:
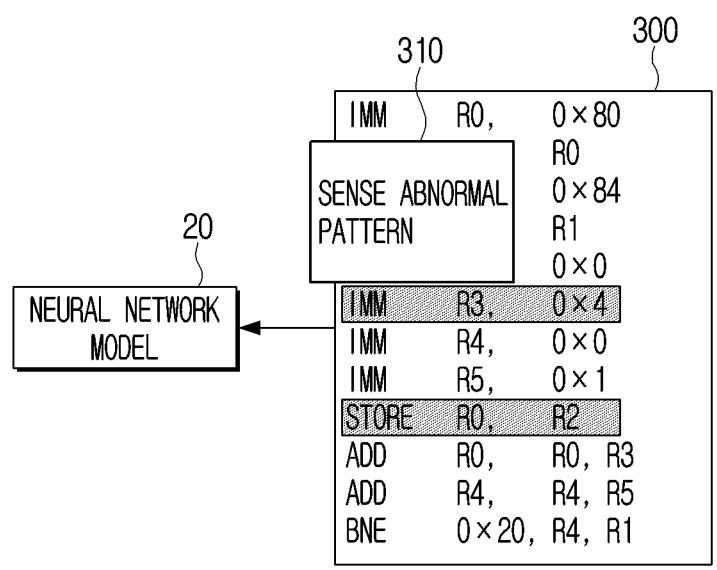
FIG. 3 is a view provided to explain a process in which an electronic apparatus identifies instructions corresponding to a safety function and different functions.

FIG. 3 is a diagram of a process of identifying whether an instruction executed in the dedicated cores is an instruction corresponding to a function different from a safety function through a trained neural network model according to an embodiment.

In an embodiment, the electronic apparatus 100 may input a set of instructions 300 executed in the first core from among at least one dedicated core that is set to perform only a safety function to the trained neural network model 20. The trained neural network model 20 may compare the pattern of the instruction included in the input set of instructions with the pattern of the instruction corresponding to the safety function that is set to be executed in the first core. The trained neural network model 20 may output a probability value based on whether the pattern of the instruction included in the set of instructions is different from the pattern of the instruction corresponding to the safety function. In this case, the probability value may be a probability value that a part of instructions executed in the first core is an instruction corresponding to the safety function.

For example, as shown in FIG. 3, if it is identified that two instructions (IMM R3, 0X4 and STORE R0, R2) from among a set of instructions 300 are different from the pattern of the instruction corresponding to the safety function, the trained neural network model 20 may output a low probability value. If the probability value is equal to or less than the threshold range, the trained neural network model 20 may output a signal 320 indicating that an abnormal pattern is sensed. When the signal indicating that an abnormal pattern is sensed, the electronic apparatus 100 may convert the operation state from a normal state to a safe state.

In another embodiment, the electronic apparatus 100 may transmit information on the sensed abnormal pattern to a server managing the electronic apparatus 100 or a device of a manager. When receiving a signal indicating that there is no problem in the abnormal pattern sensed by the electronic apparatus 100 from the server or the device of the manager, the electronic apparatus 100 may convert the operation state from the safe state to the normal state. In another embodiment, when receiving information capable of resolving a problem related to the sensed abnormal pattern from the server or the device of the manager, the electronic apparatus 100 may modify a part of the plurality of instructions stored in the memory 110 so that the instruction executed in the dedicated cores becomes an instruction corresponding to a safety function based on the received information. For example, the electronic apparatus 100 may delete or modify two instructions (IMM R3, 0X4 and STORE R0, R2) where the abnormal pattern is sensed.

Figure 4:
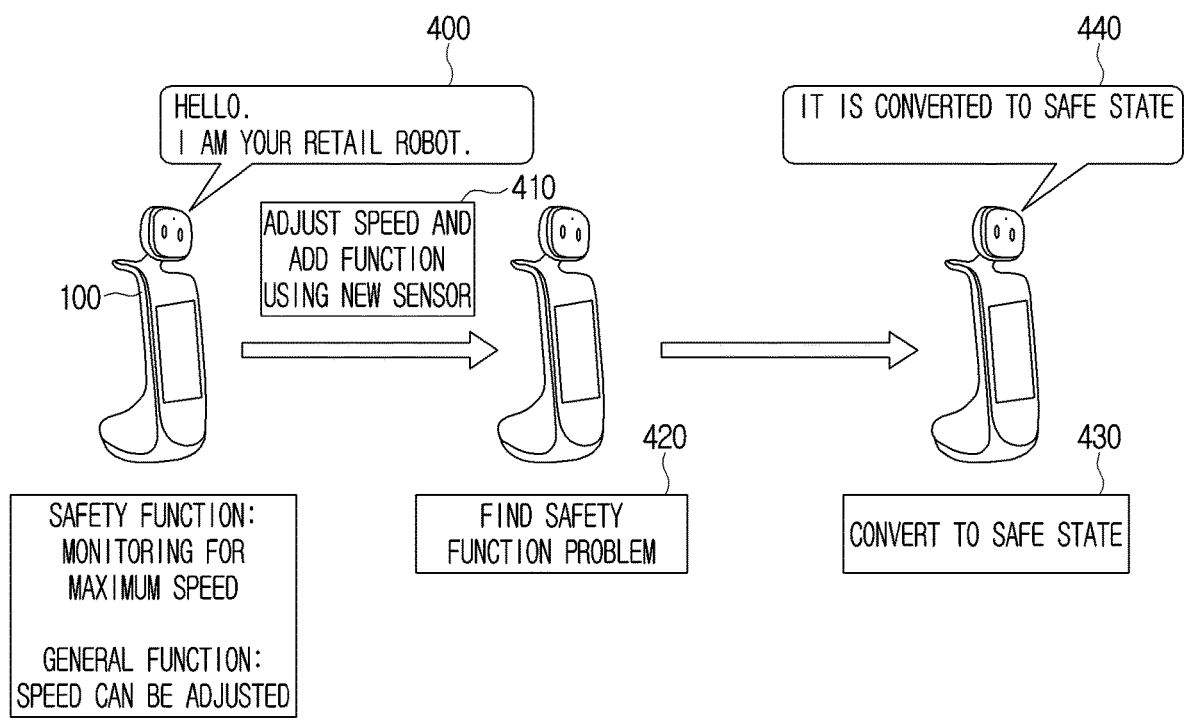
FIG. 4 is a diagram of an operation of an electronic apparatus according to an embodiment.

FIG. 4 is a diagram of an operation of the electronic apparatus 100 according to an embodiment. FIG. 4 shows a case where the electronic apparatus 100 is implemented as a retail bot, but this is only an example. The electronic apparatus 100 may be implemented as various devices.

When the electronic apparatus 100 which is implemented as a retail bot operates in a normal state, the electronic apparatus 100 may perform predetermined general functions and safety functions while providing a message 400 responding to customers. For example, while operating in the normal state, the general functions performed by the electronic apparatus 100 may be the function of adjusting the speed of the electronic apparatus 100. The safety function capable of monitoring or controlling the function of adjusting the speed of the electronic apparatus 100 may be the function of monitoring maximum speed violation. Accordingly, the electronic apparatus 100 may provide a message or perform an operation for responding to customers while performing the general function and safety function corresponding to the movement speed.

When a command or a signal for updating various functions is received from an external device (e.g., an external server, a recording medium, etc.) or a user, the electronic apparatus 100 may update general functions or safety functions. For example, as shown in FIG. 4, if update information regarding the received speed control function is received from an external device, the electronic apparatus 100 may add (410) a speed control function using a new sensor. Even if various general functions are updated, that should not affect the instruction executed by the dedicated cores which are set to execute only an instruction corresponding to a safety function. In other words, if the update on the general functions does not affect the safety functions, the electronic apparatus 100 may guarantee that the safety functions can be performed normally.

Accordingly, the electronic apparatus 100 may monitor an instruction to be executed in the dedicated cores which are set to perform only a safety function from among a plurality of cores. Specifically, the electronic apparatus 100 may identify whether an instruction to be executed in the dedicated cores is an instruction corresponding to a safety function. For example, the electronic apparatus 100 may obtain a probability value by comparing the pattern of the instruction to be executed in the dedicated cores with the pattern of the instruction corresponding to a safety function. In this case, the probability value may be a probability value that the instruction to be executed in the dedicated cores is an instruction corresponding to a safety function. If the obtained probability value is equal to or less than a threshold range, the electronic apparatus 100 may identify that the instruction to be executed in the dedicated cores is an instruction corresponding to a function different from the safety function.

If it is identified that the instruction to be executed in the dedicated cores is an instruction corresponding to a function different from the safety function, the electronic apparatus 100 may determine that a problem has been found (420) on the safety function. In other words, if it is identified that the instruction to be executed in the dedicated cores is an instruction corresponding to a function different from the safety function, the electronic apparatus 100 may identify that there is a high possibility that the safety function cannot be performed normally. Subsequently, the electronic apparatus 100 may convert the operation state from a normal state to a safe state (430). If the electronic apparatus 100 operates in the normal state after a problem on the safety function is found, the function of monitoring maximum speed violation may not operate normally, leading to another problem.

Accordingly, the electronic apparatus 100 may operate in the safe state and provide a message (440) indicating that an instruction corresponding to a function different from the safety function has been executed in the dedicated cores (e.g., 'the operation state is converted to a safe state', etc.). The message may be output in the form of voice as shown in FIG. 4, but this is only an example. The message may be displayed on a display. In another embodiment, the electronic apparatus 100 may cut off the power or stop the general function or the safety function that is currently performed. For example, the electronic apparatus 100 may stop the operation of providing a response message to a customer while moving and provide a message indicating that a problem related to a safety function has occurred at the current location.

In another embodiment, when the operation state is converted to the safe state, the electronic apparatus 100 may transmit information related to the instruction corresponding to the function different from the safety function, which is identified as being executed in the dedicated cores, to a server managing the electronic apparatus 100 or a device of a manager. The electronic apparatus 100 may determine the operation state based on the information on the instruction received from the server of the device of the manager. For example, if information that the instruction executed in the dedicated cores is an instruction corresponding to the safety function is received from the server or the device of the manager, the electronic apparatus 100 may convert the operation state from the safe state to the normal state again. In another embodiment, if information to delete or modify the instruction is received from the server or the device of the manager, the electronic apparatus 100 may execute only the instruction corresponding to the safety function in the dedicated cores by modifying a part of the plurality of instructions stored in the memory 110 based on the received information. Subsequently, the electronic apparatus 100 may convert the operation state from the safe state to the normal state.

Figure 5:
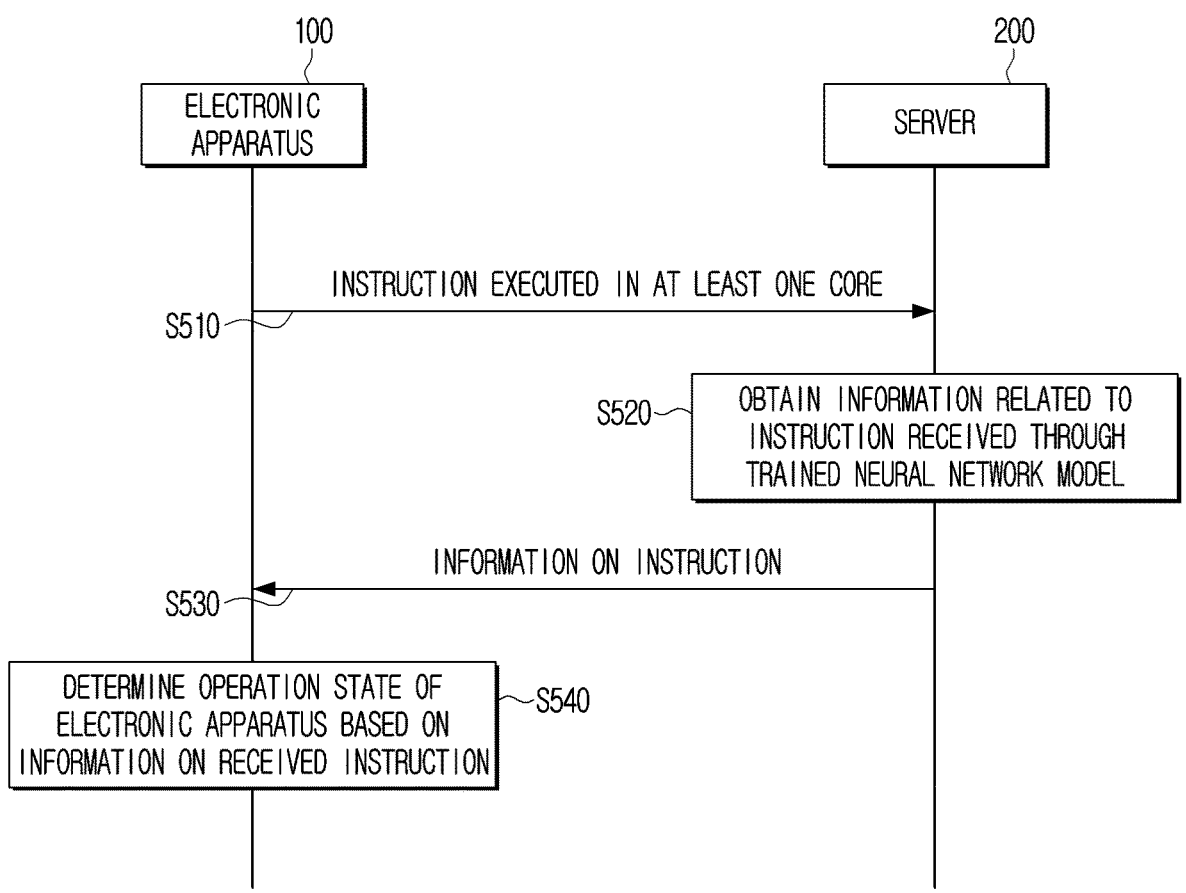
FIG. 5 is a sequence diagram of an operation of an electronic apparatus and a server according to an embodiment.

FIG. 5 is a sequence view of an operation between the electronic apparatus 100 and the server 200 according to an embodiment. FIG. 5 is a sequence view provided to explain a case in which a trained neural network model, capable of identifying whether the instruction executed in the dedicated cores of the electronic apparatus 100 is an instruction corresponding to a function different from a safety function, is stored in the sever 200.

First, the electronic apparatus 100 may transmit an instruction executed in at least one core to the server 200 including a trained neural network model (S510). In this case, the at least one core may be a dedicated core which is set to execute only an instruction corresponding to a safety function. The server 200 may obtain information related to the received instruction through the trained neural network model (S520). The information related to the instruction, which is obtained by the server 200, may include a probability value that the instruction received from the electronic apparatus 100 is an instruction corresponding to a function different from a safety function, information regarding the abnormal pattern sensed on the received instruction, and modification information for resolving the sensed abnormal pattern, etc. The server 200 may transmit the information regarding the obtained instruction to the electronic apparatus 100 (S530).

The electronic apparatus 100 may determine the operation state based on the information on the instruction received from the server 200 (S540). In an embodiment, when information is received from the server 200 indicating that the probability that the instruction executed in the dedicated cores is an instruction corresponding to a function different from a safety function is equal to or less than a threshold range, the electronic apparatus 100 may convert the operation state from the normal state to the safe state. In addition, while operating in the safe state, the electronic apparatus 100 may modify the plurality of instructions stored in the memory 110 based on the modification information for resolving the abnormal pattern received from the server 200.

In another embodiment, the information may be received from the server 200 indicating that the probability that the instruction executed in the dedicated cores is an instruction corresponding to a function different from a safety function exceeds the threshold range, the electronic apparatus 100 may perform general functions and safety functions while operating in the normal state.

Figure 6:
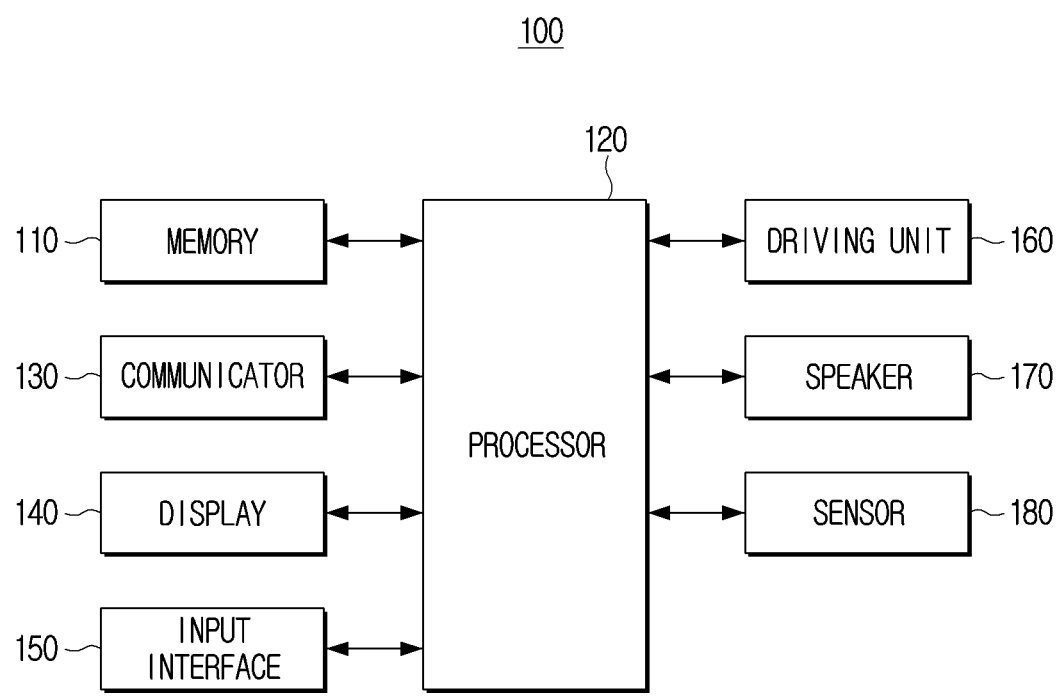
FIG. 6 is a block diagram showing configuration of an electronic apparatus in detail according to an embodiment.

FIG. 6 is a block diagram showing configuration of the electronic apparatus 100 according to an embodiment. As shown in FIG. 6, the electronic apparatus 100 may include the memory 110, the processor 120, a communicator 130, a display 140, an input interface 150, a driving unit 160, a speaker 170, and a sensor 180. The memory 110 and the processor 120 have been described in detail with reference to FIG. 1 and thus, further description will not be provided.

The communicator 130 may include a circuitry, and may perform communication with a server or an external device. Specifically, the processor 120 may receive and transmit various data or information from and to a server or an external device connected through the communicator 130. In addition, while the electronic apparatus 100 operates in the normal state, the communicator 130 may transmit an instruction executed in the dedicated cores to a server including a trained neural network model. In other words, if a neural network model capable of identifying whether the instruction executed in the dedicated cores is an instruction corresponding to a function different from a safety function is stored in an external server, the communicator 130 may transmit the instruction executed in the dedicated cores to the external server under the control of the processor 120. The communicator 130 may receive information regarding whether the instruction executed in the dedicated cores is an instruction corresponding to a function different from a safety function from the server including the neural network model. Accordingly, the processor 120 may determine whether to convert the operation state to the safe state based on the information received through the communicator 130.

The communicator 130 may receive learning data for training the neural network model stored in the memory 120 from the external server. The learning data may include information on an opcode of each of a plurality of instructions, an operand of the opcode and a register corresponding to each of the plurality of instructions.

The communicator 130 may include various communication modules to perform communication with an external device. For example, the communicator 130 may include a wireless communication module and for example, may include a cellular communication module using at least one of LTE, LTE Advance (LTE-A), code division multiple access (CDMA), wideband CDMA (WCDMA), universal mobile telecommunications system (UMTS), Wireless Broadband (WiBRO), 5th generation (5G), Global System for Mobile Communications (GSM), etc. As another example, the wireless communication module may include, for example, at least one of wireless fidelity (WiFi), Bluetooth, Bluetooth Low Energy (BLE), or Zigbee.

The display 140 may be implemented as Liquid Crystal Display Panel (LCD), Organic Light Emitting Diodes (OLED), etc. and in some cases, may be implemented as a flexible display, a transparent display, etc. The display 140 may be implemented as a touch screen along with a touch panel. However, the present disclosure is not limited thereto, and the display 140 may be implemented differently depending on the type of the electronic apparatus 100.

The display 140 may display various information under the control of the processor 120. In particular, the processor 140 may display a message or an indicator indicating that an instruction corresponding to a function different from a safety function is identified in the dedicated cores.

The input interface 150 may include circuitry, and the processor 120 may receive a user command for controlling the operation of the electronic apparatus 100 through the input interface 150. The input interface 150 may include a touch sensor, a (digital) pen sensor, a pressure sensor, a key, or a microphone. The touch sensor may use, for example, at least one of a capacitive type, a pressure-sensitive type, an infrared type, or a ultrasound type.

In particular, a command for updating a new function may be input through the input interface 150. In addition, the input interface 150 may receive an operation related to the operation of loading a neural network model stored in a non-volatile memory onto a volatile memory. Further, the input interface 150 may receive a user command for converting the operation state of an electronic apparatus.

The driving unit 160 may be configured to move the electronic apparatus 100, and may include a motor and a plurality of wheels. Specifically, the driving unit 160 may change the direction and speed of the movement of the electronic apparatus under the control of the processor 120. When the operation state is converted to a safe state, the driving unit 160 may stop the operation of the electronic apparatus 100 under the control of the processor 120.

The speaker 170 may be configured to output not only various audio data where various processing such as decoding, amplification and noise filtering is performed by an audio processor but also various alert sounds or voice messages. In particular, the speaker 170 may output a message indicating that the instruction executed in the dedicated cores is identified as an instruction corresponding to a function different from a safety function in the form of voice or as an alert sound.

The sensor 180 may sense various state information of the electronic apparatus 100. For example, the sensor 180 may include a movement sensor (e.g., a gyro sensor, an acceleration sensor, etc.) capable of sensing movement information of the electronic apparatus 100, a sensor capable of sensing location information (e.g., a Global Positioning System (GPS) sensor), a sensor capable of sensing environment information around the electronic apparatus 100 (e.g., a temperature sensor, a humidity sensor, an air pressure sensor, etc.), a sensor capable of sensing user information of the electronic apparatus 100 (e.g., a blood pressure sensor, a blood sugar sensor, a pulse rate sensor, etc.), a sensor capable of sensing a presence of the user (e.g., a camera, a UWB sensor, an IR sensor, a proximity sensor, an optical sensor, etc.), and the like. In addition, the sensor 180 may further include an image sensor for photographing the outside of the electronic apparatus 100, and the like.

Figure 7:
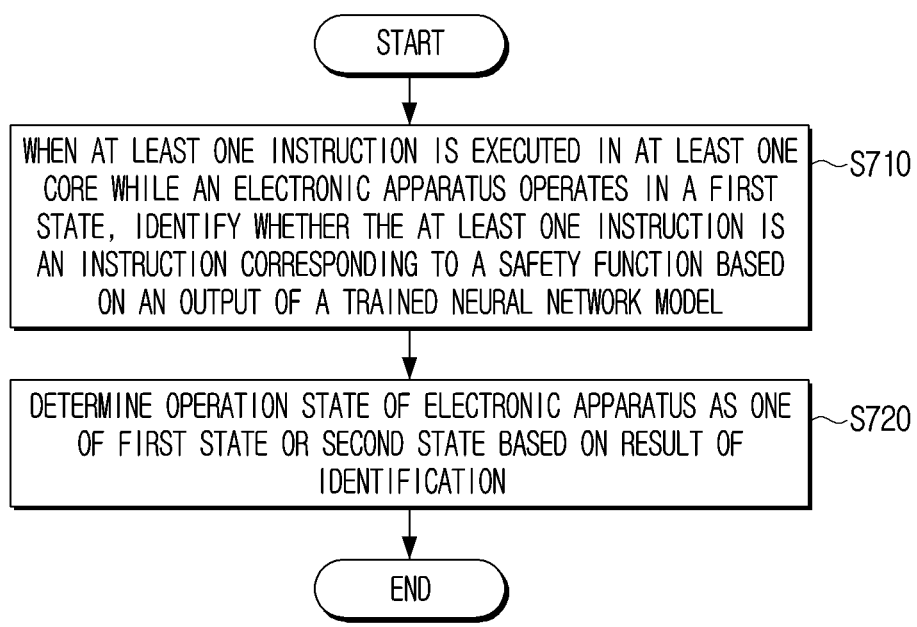
FIG. 7 is a flowchart of a controlling method of an electronic apparatus according to an embodiment.

FIG. 7 is a flowchart of a controlling method of the electronic apparatus 100 according to an embodiment.

First, when at least one instruction is executed in at least one core while the electronic apparatus 100 operates in a normal state (first state), the electronic apparatus 100 may identify whether the at least one instruction is an instruction corresponding to a safety function based on an output of a trained neural network model (S710). In this case, the at least one core may be a dedicated core that is set to execute only an instruction corresponding to a safety function. In other words, the electronic apparatus 100 may identify whether the instruction executed in the dedicated core is an instruction corresponding to a safety function. Specifically, the electronic apparatus 100 may obtain a probability value by comparing the pattern of the instruction executed in the dedicated core with the pattern of the instruction that is set to be executed in the dedicated core through a trained neural network model. The probability value may be a probability value that the instruction executed in the dedicated core is an instruction corresponding to a safety function. In addition, the electronic apparatus 100 may identify whether the at least one instruction executed in the dedicated core is an instruction corresponding to a function different from a safety function based on the probability value obtained through a neural network model.

Based on the result of the identification, the electronic apparatus 100 may determine the operation state of the electronic apparatus 100 as one of a normal state or a safe state (second state) (S720). Specifically, if the probability value obtained through a trained neural network model is equal to or less than a threshold range, the electronic apparatus 100 may identify that an instruction corresponding to a function different from a safety function is executed in the dedicated core. In this case, the electronic apparatus 100 may convert the operation state to the safe state. In addition, the electronic apparatus 100 may cut off power or stop the general function, etc. that is currently performed by converting the operation state to the safe state. In another embodiment, the electronic apparatus 100 may provide a message indicating that an instruction corresponding to a function different from a safety function is being executed in the dedicated core as the electronic apparatus 100 is converted to the safe state.

When the probability value obtained through a trained neural network exceeds the threshold range, the electronic apparatus 100 may identify that an instruction corresponding to a safety function is executed in the dedicated core. In this case, the electronic apparatus 100 may maintain the operation state as the normal state.

According to the above-described various embodiments, an electronic apparatus may monitor whether an instruction executed in a core that is set to perform a safety function is an instruction corresponding to a function different from the safety function and thus, a user can identify effectively whether there is a defect in the safety function even though various functions of the electronic apparatus are updated.

The above-described various embodiments may be implemented as software including instructions that can be stored in machine-readable storage media, which can be read by machine (e.g.: computers). The machine refers to an apparatus that calls instructions stored in a storage medium, and can operate according to the called instructions, and the apparatus may include an electronic apparatus (e.g.: an electronic apparatus 100) according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether data is stored in the storage medium semi-permanently or temporarily. For example, 'a non-transitory storage medium' may include a buffer where data is stored temporarily.

In addition, the method according to the various embodiments described above may be provided while being included in a computer program product. A computer program product may refer to a product, and it can be traded between a seller and a buyer. The computer program product can be distributed on-line in the form of a storage medium that is readable by machines (e.g.: a compact disc read only memory (CD-ROM)), or through an application store (e.g.: Play Store™). In the case of on-line distribution, at least a portion of the computer program product (e.g., a downloadable app) may be stored in a storage medium such as the server of the manufacturer, the server of the application store, and the memory of the relay server at least temporarily, or may be generated temporarily.

Each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the scope of the disclosure as disclosed in the accompanying claims. Such modifications should not be individually understood from the technical spirit or the prospect of the disclosure.

What is claimed is:

1. An electronic apparatus comprising:
a memory configured to store at least one instruction corresponding to at least one safety function of the electronic apparatus, and at least one instruction corresponding to at least one general function of the electronic apparatus; and
a processor comprising a plurality of cores,
wherein the processor is configured to:
execute, by using at least one core among the plurality of cores, the instruction corresponding to the at least one safety function of the electronic apparatus, wherein
a safety function includes a function that monitors whether a general function performed by the electronic apparatus operates within a normal range and controls a factor related to the general function based on an identification that the general function does not operate within the normal range;
execute, by remaining cores of the plurality of cores, the instruction corresponding to the at least one general function of the electronic apparatus;
based on at least one instruction being executed in the at least one core while the electronic apparatus operates in a first state, identify whether the at least one instruction corresponds to the at least one safety function based on an output of a trained neural network model; and
based on a result of the identification, maintain the electronic apparatus to operate in the first state or convert an operation state of the electronic apparatus to a second state.

2. The electronic apparatus as claimed in claim 1, wherein the processor is configured such that the at least one core is a core dedicated to execute only the instruction corresponding to the at least one safety function.

3. The electronic apparatus as claimed in claim 1, wherein the neural network model is a model trained based on information on a plurality of instructions corresponding to the at least one safety function, and
wherein the information on the plurality of instructions comprises an instruction code corresponding to each of the plurality of instructions, an operand corresponding to the instruction code, and information on a register corresponding to each of the plurality of instructions.

4. The electronic apparatus as claimed in claim 1, wherein the processor is further configured to:
obtain a probability that the at least one instruction executed in the at least one core is the instruction corresponding to the at least one safety function based on the output of the neural network model; and
based on the obtained probability being equal to or less than a threshold range, identify that the at least one instruction executed in the at least one core is an instruction corresponding to a function different from the at least one safety function.

5. The electronic apparatus as claimed in claim 4, wherein the threshold range is determined based on a safety integrity level of the at least one safety function.

6. The electronic apparatus as claimed in claim 4, wherein the processor is further configured to:
based on identifying that the at least one instruction executed in the at least one core is the instruction corresponding to the at least one safety function, maintain the operation state of the electronic apparatus as the first state; and based on identifying that the at least one instruction executed in the at least one core is an instruction corresponding to a function different from the at least one safety function, convert the operation state of the electronic apparatus to the second state.

7. The electronic apparatus as claimed in claim 1, wherein the processor is further configured to:

based on an instruction, corresponding to a general function to be executed in the remaining cores, being updated, identify whether there is an instruction, stored in the memory, that corresponds to a function different from the at least one safety function and is from among instructions to be executed in the at least one core, wherein the remaining cores exclude the at least one core.

8. The electronic apparatus as claimed in claim 1, wherein the processor is further configured to, based on the operation state of the electronic apparatus being converted to the second state, control to stop a general operation performed by the electronic apparatus or block power of the electronic apparatus.

9. The electronic apparatus as claimed in claim 1, wherein the processor is further configured to, based on the operation state of the electronic apparatus being converted to the second state, provide a message indicating that an instruction corresponding to a function different from the at least one safety function is identified in the at least one core.

10. The electronic apparatus as claimed in claim 1, wherein the processor further comprises a communicator comprising a circuitry, wherein the processor is further configured to:

control the communicator to transmit the at least one instruction executed in the at least one core to a server comprising the trained neural network model while the electronic apparatus operates in the first state; and receive, from the server, information regarding whether the at least one instruction is an instruction corresponding to a function different from the at least one safety function.

11. A controlling method of an electronic apparatus having a processor including a plurality of cores, the method comprising:

storing, in a memory, at least one instruction corresponding to at least one safety function of the electronic apparatus, and at least one instruction corresponding to at least one general function of the electronic apparatus;

executing, by at least one core among the plurality of cores, the instruction corresponding to the at least one safety function of the electronic apparatus, wherein a safety function includes a function that monitors whether a general function performed by the electronic apparatus operates within a normal range and controls a factor related to the general function based on an identification that the general function does not operate within the normal range;

executing, by remaining cores of the plurality of cores, the instruction corresponding to the at least one general function of the electronic apparatus;

identifying, based on at least one instruction being executed in the at least one core while the electronic apparatus operates in a first state, whether the at least one instruction corresponds to the at least one safety function based on an output of a trained neural network model, and based on a result of the identification, maintaining the electronic apparatus to operate in the first state or converting an operation state of the electronic apparatus to a second state.

12. The controlling method as claimed in claim 11, wherein the at least one core is a core dedicated to execute only the instruction corresponding to the at least one safety function.

13. The controlling method as claimed in claim 11, wherein the neural network model is a model trained based on information on a plurality of instructions corresponding to the at least one safety function, wherein the information on the plurality of instructions comprises an instruction code corresponding to each of the plurality of instructions, an operand corresponding to the instruction code and information on a register corresponding to each of the plurality of instructions.

14. The controlling method as claimed in claim 11, wherein the identifying comprises:

obtaining a probability that the at least one instruction executed in the at least one core is the instruction corresponding to the at least one safety function based on the output of the neural network model; and identifying, based on the obtained probability being equal to or less than a threshold range, that the at least one instruction executed in the at least one core is an instruction corresponding to a function different from the at least one safety function.

15. The controlling method as claimed in claim 14, wherein the threshold range is determined based on a safety integrity level of the at least one safety function.

16. The controlling method as claimed in claim 14, wherein the maintaining or the converting comprises:

maintaining, based on identifying that the at least one instruction executed in the at least one core is the instruction corresponding to the at least one safety function, the operation state of the electronic apparatus as the first state; and converting, based on identifying that the at least one instruction executed in the at least one core is an instruction corresponding to a function different from the at least one safety function, the operation state of the electronic apparatus to the second state.

17. The controlling method as claimed in claim 11, wherein the identifying comprises:

based on an instruction, corresponding to a general function to be executed in the remaining cores, being updated, identifying whether there is an instruction, stored in the memory of the electronic apparatus, that corresponds to a function different from the at least one safety function and is from among instructions to be executed in the at least one core, wherein the remaining cores exclude the at least one core.

18. The controlling method as claimed in claim 11, wherein the converting comprises:

controlling, based on the operation state of the electronic apparatus being converted to the second state, to stop a general operation performed by the electronic apparatus or block power of the electronic apparatus.

19. The controlling method as claimed in claim 11, wherein the converting comprises:

providing, based on the operation state of the electronic apparatus being converted to the second state, a message indicating that an instruction corresponding to a function different from the at least one safety function is identified in the at least one core.

20. The controlling method as claimed in claim 11, further comprising:
- transmitting the at least one instruction executed in the at least one core to a server including the trained neural network model while the electronic apparatus operates in the first state; and
- receiving, from the server, information regarding whether the at least one instruction is an instruction corresponding to a function different from the at least one safety function.

\* \* \* \* \*